United States Patent [19]

Reisfeld et al.

[11] 4,128,411

[45] Dec. 5, 1978

[54] GLASS COMPOSITIONS HAVING FLUORESCENCE PROPERTIES

[75] Inventors: Renata Reisfeld, Jerusalem, Israel; Yona Eckstein, Reno, Nev.; Leah Boehm, Jerusalem, Israel

[73] Assignee: The United States of America as represented by the Secretary of the Army, Washington, D.C.

[21] Appl. No.: 806,642

[22] Filed: Jun. 15, 1977

Related U.S. Application Data

[62] Division of Ser. No. 650,658, Jan. 20, 1976, abandoned.

[51] Int. Cl.$^2$ .................. C03B 23/20; C03B 9/00; B01F 3/00; C03C 3/00
[52] U.S. Cl. .................................... 65/18; 65/32; 65/37; 65/66; 65/134; 65/305; 252/301.4 R; 106/47 Q
[58] Field of Search ............ 65/305, 37, 306, 33, 65/32, 361, 18, 66, 134; 252/301.4 R; 106/47 Q

[56] References Cited

U.S. PATENT DOCUMENTS

| | | |
|---|---|---|
| 418,881 | 1/1890 | Barnes ............................ 65/305 |
| 626,072 | 5/1899 | Messer ............................ 65/361 |
| 3,278,285 | 10/1966 | Pickering ........................ 65/307 X |
| 3,325,299 | 6/1967 | Araujo ............................ 65/30 R X |
| 3,525,698 | 8/1970 | Leto et al. ...................... 252/301.4 R |
| 3,779,733 | 12/1973 | Janakirama-Rao ............. 65/30 R X |
| 3,855,144 | 12/1974 | Barber et al. .................. 252/301.4 R |
| 3,929,440 | 12/1975 | Oldfield ......................... 65/32 |
| 3,930,824 | 1/1976 | Knowles ........................ 65/37 |
| 3,958,970 | 5/1976 | Auzel ............................. 65/33 |
| 3,979,322 | 9/1976 | Alexeev et al. ............... 252/301.4 P |

FOREIGN PATENT DOCUMENTS 1208565  10/1970  United Kingdom ............ 252/301.4 R

*Primary Examiner*—S. Leon Bashore
*Assistant Examiner*—Frank W. Miga
*Attorney, Agent, or Firm*—William G. Gapcynski; Werten F. W. Bellamy; Sherman D. Winters

[57] ABSTRACT

The invention relates to a method for producing glass, in which an oxide glass is mixed with a reducing agent and a combination of compounds which provide a dopant, donor-acceptor ion pair. This ion pair is selected from the group consisting of trivalent thulium plus trivalent cerium, trivalent bismuth plus trivalent europium, or trivalent bismuth plus trivalent samarium. The resulting mixture is homogenized and heated to about 1100° C. The hot melt is allowed to fall on a ceramic surface and pressed with a second ceramic surface to produce a glass disk. When borax, phosphate, and germanate glasses are used, the glass ingredient is dried overnight at 150° C followed by addition of a quantity of dopant ions, then homogenized, heated, and a disk formed as above.

The glass thus produced is capable of emitting monochromatic radiation in predetermined regions of the spectrum wherein the emitted radiation has an unexpectedly high intensity compared with radiation emitted by singly doped glass.

18 Claims, 5 Drawing Figures

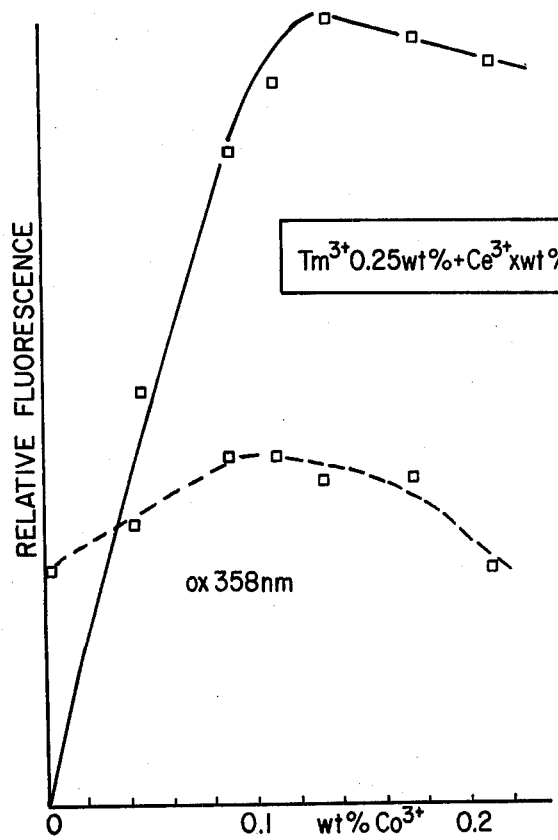
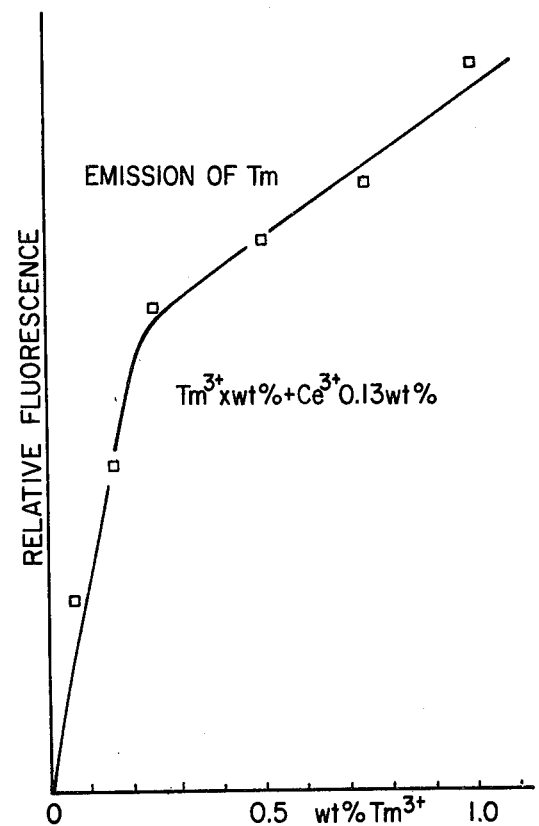
FIG. 2
FIG. 3
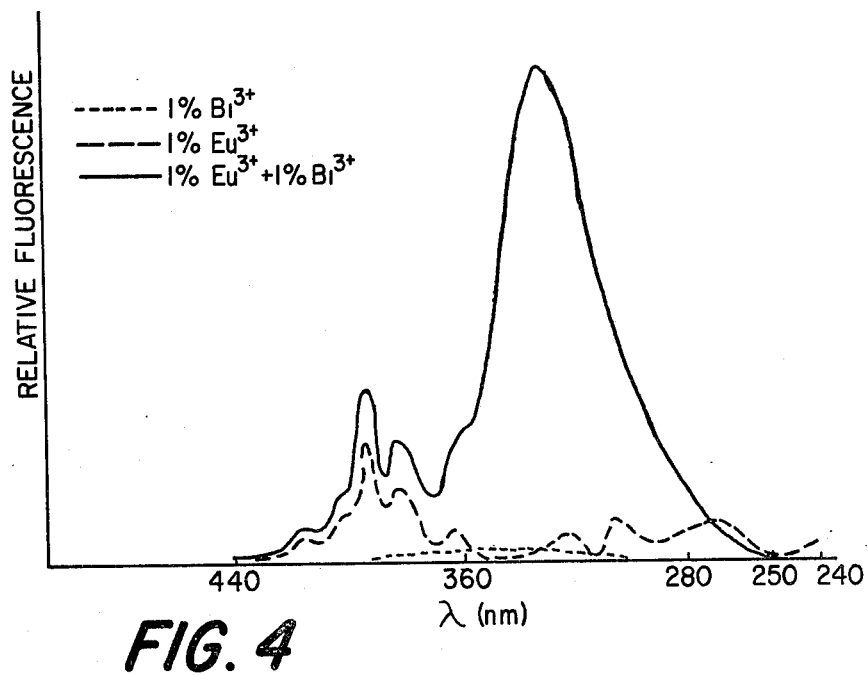
FIG. 4

GLASS COMPOSITIONS HAVING FLUORESCENCE PROPERTIES

This is a division of application Ser. No. 650,658, filed Jan. 20, 1976, and now abandoned.

BACKGROUND OF THE INVENTION

1. Field of the Invention

The field of the invention pertains to doped glasses containing additional constituents which, upon excitation by various types of radiation, emit radiation many times the intensity of the emitting radiation, in singly doped glasses.

2. Description of the Prior Art

It is known that crystals have similar properties of emitting radiation upon excitation by external radiation but the emission obtained from the glasses of the invention is stronger than that of comparable crystals. The advantages of the present invention over the prior art is that production of the glasses is simple and economical and emission of radiation in a desired spectral range at a desired intensification can be predetermined. Further, optical elements of any reasonable size and shape can be produced without difficulty. The systems of combinations of rare earths and additional ion of the present invention yield the desired degree of light or radiation intensification in a desired range of the spectrum.

The property of rare earths when activated by radiation to emit predetermined spectral lines is known as in U.S. Pat. No. 3,793,527 issued Feb. 19, 1974. Use of rare earth materials in a host material such as manufactured crystals is taught by Kiss in U.S. Pat. No. 3,438,881 issued Apr. 15, 1969. The patent issued to Kotera et al, U.S. Pat. No. 3,769,510 on Oct. 30, 1975 teaches combining rare earths with phosphors and that the inclusion of the rare earths strongly influences the light intensity output of the phosphors, sealed in a glass tube, when excited by various radiation sources and used as a dosimeter.

The present invention distinguishes over the teachings of the above prior art in that the present invention concerns types of glasses which contain rare earth and additional ingredients homogeniously mixed therewith in predetermined ratios of the rare earths herein specified to produce fluorescence of an intensity which is many fold that of the intensity of the activator (rare earth) radiation.

SUMMARY OF THE INVENTION

The present invention concerns glasses such as borate glass, phosphate glass, calibo glass and germanate glass containing predetermined quantities of certain components adapted to result in the emission of radiation in the desired spectral range, and at a desired predetermined intensification. Glasses of the invention contain either a combination of thulium and cerium or a combination of bismuth with either europium or with samarium. These combinations result in manifold intensification of emitted radiation.

Glasses of the present invention comprising thulium and cerium emit strongly in the blue part of the spectrum, and this wavelength is of special interest for various applications. The energy transfer from $Ce^{3+}$ to $Tm^{3+}$ in certain glasses results in an intense blue fluorescence of $Tm^{3+}$ at about 455 nm, as will be set out in greater detail hereinafter. The evidence for this energy transfer is seen in FIG. 1.

Glasses according to the present invention comprising europium and bismuth are characterized by a bismuth pumping band at about 3300Å in germanate glass and about 3050Å in borax glass. Similar results are obtained with the system bismuth-samarium in certain oxide glasses. These will be dealt with in greater detail hereinafter.

It is a primary object of the invention to provide glasses having inorganic compounds which, upon excitation by various types of radiation, emit monochromatic radiation in certain defined regions of the spectrum in intensity many times greater than the intensity of the emitting radiation, by a singly doped glass.

It is a further object of the invention to provide glasses having combinations of predetermined amounts of inorganic compounds to yield a desired degree of light or radiation intensification in a desired range of the spectrum upon excitation by various types of radiation.

It is a further object of the invention to provide glasses having combinations of inorganic compounds comprising rare earths which, upon excitation by various types of radiation, emit radiation of a predetermined wavelength, or of more than one predetermined wavelength many times the intensity of the emitting radiation, by a singly doped glass.

It is a further object of the invention to provide glasses having predetermined combinations of inorganic compounds comprising rare earths dopant ions which, upon excitation of various types of radiation, emit radiation of a predetermined wavelength or of more than one predetermined wavelength many times the intensity of the exciting radiation.

These and other objects will become apparent from the following description in which:

FIG. 2 shows the change in relative fluorescence of borate glass for varying percentage by weight of cerium with a given percentage weight of thulium;

FIG. 3 shows the change in relative fluorescence of borate glass for varying percentage by weight of thulium with a given percentage weight of cerium; and FIG. 4 shows the excitation spectra of glasses containing europium and bismuth, separately and combined, in germanate glass.

DESCRIPTION OF THE PREFERRED EMBODIMENTS

Figure 1:
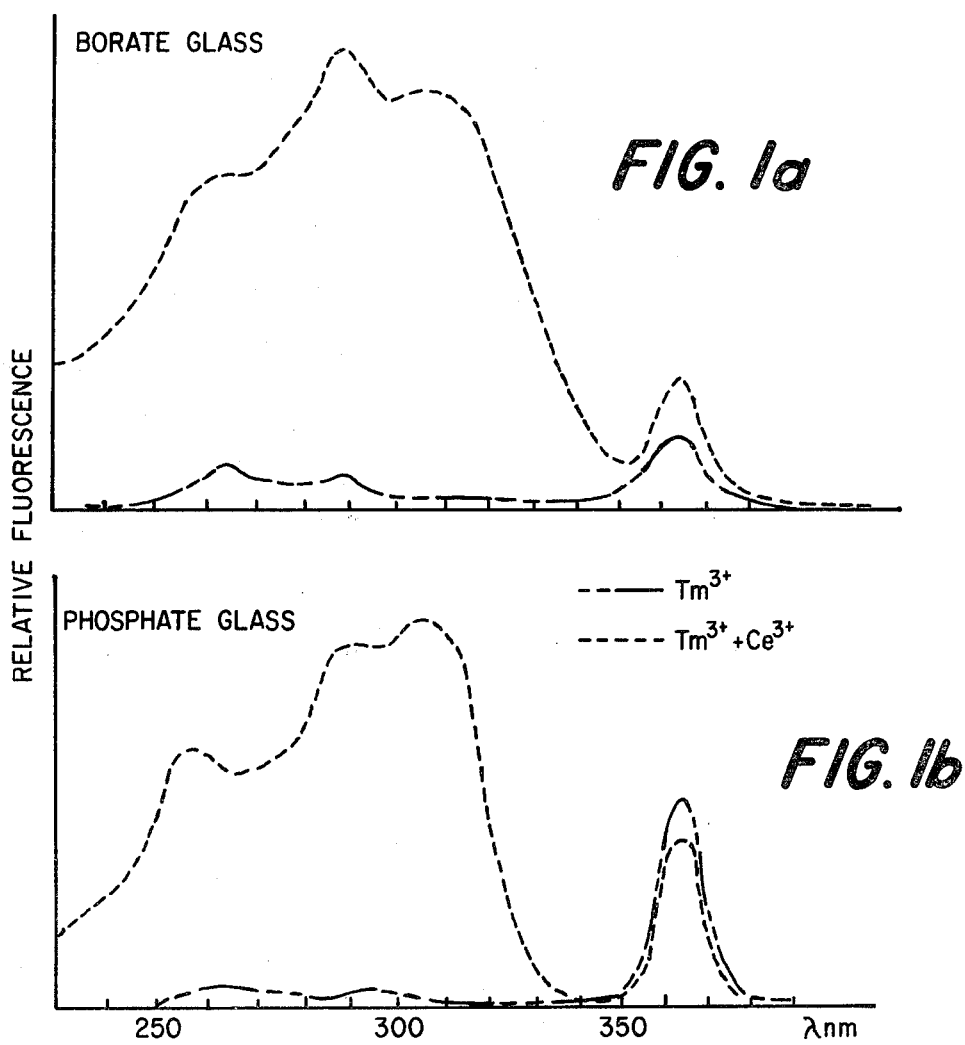
FIGS. 1a and 1b show the increase in fluorescence in the blue part of the spectrum in borate and phosphate glass with the addition of thulium only and thulium plus cerium.

The various glasses of this invention may be prepared by the process generally described in the Abstract of the Disclosure. Specific examples will be given below. The components of the glasses are of analytical grade purity.

EXAMPLE 1: Borate Glass

A mixture of sodium tetraborate (borax), $Na_2B_4O_7 \cdot 10H_2O$ and boric acid, $H_3BO_3$ at a weight ratio of 2:1 by weight was prepared, together with the appropriate rare earths. These were $Tm_2O_3$, 99.9% purity and $(NH_4)_2Ce(NO_3)_6$ — analyzed "analar" reagent grade. A suitable reducing agent was added to the mixtures containing the rare earths. As such there was used mannitol (50 mg per 2 g glass mixture).

The borate mixture with the added rare earths and additional dopant and reducing agent were placed in a glass or plastic vial, together with a few glass pellets, and homogenized in an electric vibrator for 10 minutes.

The homogenous mixture was transferred to a platinum crucible and heated in an electric oven at about 1100° C for at least 15 minutes until a clear transparent product was obtained. A quantity of the hot melt was allowed to fall directly onto a clean white glazed ceramic surface into the center of a 1 mm thick space ring and pressed with a second ceramic tile to produce a glass disk of 1 mm thickness and diameter of about 12 mm. After the heating losses the glass matrix has the composition $(Na_2O)$ 3.54 $(B_2O_3)$, refractive index 1.45.

When such glasses were prepared with the rare earth constituents and with the reducing agent (mannitol), cerium was completely reduced in the glass and the excess of mannitol was removed by air-oxidation, ascertained by the disappearance of the last traces of carbon, giving a clear glass.

Various batches were prepared so as to ascertain the effect of varying concentrations and proportions of the rare earths. Experiments have shown that the fluorescence reaches gradually a maximum at about 0.13% by weight concentration of $Ce^{3+}$ (FIG. 2). A further increase of cerium content results in a gradual slight decrease of fluorescence. The fluorescence increases rapidly with an increase of $Tm^{3+}$ content, and this up to about 0.2 weight-% $Tm^{3+}$ (FIG. 3). A further increase of $Tm^{3+}$ results in a further, more gradual increase of the fluorescence. Based on preliminary results, glasses containing 0.13 weight-% $Ce^{3+}$ and thulium $(Tm^{3+})$ of 0.00; 0.05; 0.15; 0.25; 0.50; 0.75 and 1.00 weight-% were prepared and tested.

EXAMPLE 2: Phosphate Glass

The basic constituent is sodium dihydrogen phosphate, $NaH_2PO_4 \cdot H_2O$, analytical reagent, 99.5% purity. The phosphate was dried for 24 hours in an electric oven at 100° C, ground in a mortar and stored in an oven at 100° C. The glass matrix loses 14.8% water upon heating at 1000° C, resulting in a composition of $Na_2O \cdot P_2O_5$, refractive index; 1.48. The phosphate glasses were prepared exactly as the borate glasses, at an oven temperature of 1000° C. Maximum fluorescence is attained at a $Ce^{3+}$ concentration of about 0.14 weight-%.

EXAMPLE 3: Calibo Glass

Boric acid, lithium carbonate and calcium carbonate were mixed in weight ratio of 77.45%, 4.75% and 17.8% and the appropriate quantities of thulium and cerium compounds were added. The mixture was heated at 900° C during 1 hour and after this at 1100° C during 2 hours. The refractive index of the glass was 1.587. Various batches were prepared, and extrapolation shows that there exists a maximum of fluorescence at a $Ce^{3+}$ concentration of about 0.15 weight-%. A satisfactory concentration of $Tm^{3+}$ is about 0.05 weight-% to 0.75 weight-%.

EXAMPLE 4: Borax Glass

Sodium tetraborate $(Na_2B_4O_7 \cdot 10H_2O)$, analyzed reagent was dried overnight at 150° C, mixed with the appropriate quantity of dopant ions and homogenized in an electric homogenizer (vibrator) during 10 minutes. The material was then transferred to a platinum crucible and heated at 1100° C for at least 30 minutes, until a clear transparent solution was obtained. The glass matrix loses water and the composition of the matrix is after the heating $35(Na_2O) \cdot 65(B_2O_3)$. A drop of the hot melt was allowed to fall directly onto a clean white glazed ceramic surface, into the center of a space ring of 1 mm thickness, and pressed with a second ceramic tile to produce a glass disk of 1 mm thickness and an approximate diameter of 12 mm. The glass is transparent in the ultraviolet and in the visible part of the spectrum.

EXAMPLE 5: Germanate Glass

A mixture was prepared comprising 3.1062 g $GeO_2$, 1.0572 g $K_2CO_3$ and 1.5095 g $BaCO_3$, all reagent grade. The final composition of the glass matrix (in mole percent) is $17K_2O \cdot 17Ba \cdot 0.66GeO_2$, its refractive index 1.64. The glass is transparent from 3000 Å, through-out the visible and I.R. range up to about 40,000 Å. The glass was prepared exactly as in Example 4, but the temperature was 1250° C and the time of heating was 3 hours. In Examples 4 and 5 the following were used as dopant ions:

$Eu_2O_3$ — 99.9% purity;
$Sm_2O_3$ — 99.9% purity;
$Bi_2O_3$ — 99.9% purity.

The following quantities of doping ions were used in the preparation of various batches of glasses of Example 4 and 5, the concentration being in weight percent of the starting material:

Table I

| Glass Type, No. of the Batch: | Concentration in Wt-% | | |
|---|---|---|---|
| | $Eu^{3+}$ | $Sm^{3+}$ | $Bi^{3+}$ |
| Borax (1) | 0.5 | — | 1.0 |
| Borax (2) | 1.0 | — | 1.0 |
| Borax (3) | — | 0.5 | 1.0 |
| Borax (4) | — | 1.0 | 1.0 |
| Germanate (1) | 0.5 | — | 1.0 |
| Germanate (2) | 1.0 | — | 1.0 |
| Germanate (3) | — | 0.5 | 1.0 |
| Germanate (4) | — | 1.0 | 1.0 |

FIG. 4 presents the excitation spectra of glasses containing europium and bismuth in germanate glass, monitored at about 6120 Å, which is the red transition of $Eu^{3+}$. A similar phenomenon was obtained with $Sm^{3+}$ and $Bi^{3+}$ in the various glasses. Comparison of the spectra in FIG. 4 shows the presence of the bismuth pumping band at about 3300 Å in the excitation spectrum of the Europium $^5D_0 \rightarrow ^7F_2$ emission when bismuth is present together with europium in the glass matrix. This indicates that energy absorbed by the bismuth excites the $^5D_0$ fluorescence (6100–6120 Å) of $Eu^{3+}$ ion.

The practical ranges of the doping ions are from about 0.2 weight percent to about 4.0 weight percent of europium and about 0.1 weight percent to about 0.2 weight percent of bismuth. The range for samarium in bismuth doped glasses is about 0.2 to about 0.8 weight percent of samarium.

The following Table illustrates the fluorescence enhancement of the acceptor in the presence of the donor in the Bi/Eu and Bi/Sm systems. The donor concentration was 1% by weight $Bi^{3+}$.

Table II

| | | activator $\eta_a/\eta_a^*$ | |
|---|---|---|---|
| Borax Glass | 1% | $Eu^{3+}$ | 1.13 |
| Germanate Glass | 1% | $Eu^{3+}$ | 47.6 |
| Germanate Glass | 0.5% | $Eu^{3+}$ | 170.0 |
| Borax Glass | 1.0% | $Sm^{3+}$ | 2.55 |
| Germanate Glass | 1% | $Sm^{3+}$ | 55.0 |

The bismuth/europium system and the bismuth/samarium system can be used in glasses such as germanate and calibo glasses. The fluorescence of the bismuth/samarium system is at about 6000 Å or 6450 Å.

Various optical elements, such as lenses, prisms, wedges etc., can be prepared from doped glasses as described in any of the foregoing examples, and this by simple casting in a suitable shape or by any other process conventionally used for the preparation of optical elements. The above is by way of example only and many variations and modifications in the exact composition of the glasses, the percentage of constituents, including the doping agents, may be resorted to without departing from the scope and spirit of the present invention.

We claim:

1. A method for producing glass, capable of emitting monochromatic radiation in predetermined regions of the spectrum wherein the emitted radiation has an unexpectedly high intensity compared with radiation emitted by singly doped glass, comprising:
   a. mixing an oxide glass in pellet form with:
      (1) a reducing agent, and
      (2) a combination of compounds selected so as to provide a dopant, donor-acceptor ion pair in predetermined relative concentrations selected from the group consisting of trivalent thulium plus trivalent cerium, trivalent bismuth plus trivalent europium, or trivalent bismuth plus trivalent samarium;
   b. homogenizing the resulting mixture;
   c. heating said homogenized mixture;
   d. dropping a quantity of the homogenized mixture in hot melt form upon a first glazed ceramic surface of predetermined configuration supporting an element for confining said hot melt mixture;
   e. pressing a second glazed ceramic disk in contact with said element and said hot melt glass matrix; and
   f. cooling said glass matrix and removing said glass matrix from said ceramic disks and said confining element.

2. A method as recited in claim 1 wherein said oxide glass is selected from the group consisting of borax glass, phosphate glass, germanate glass, and calibo glass.

3. A method as recited in claim 1 wherein said oxide glass is selected from the group consisting of borax glass, borate glass, phosphate glass, calibo glass and germanate glass and said reducing agent is mannitol.

4. A method as recited in claim 1 wherein said oxide glass is selected from the group consisting of borate glass, phosphate glass and calibo glass and said dopant ion pair is a combination of trivalent thulium and trivalent cerium.

5. A method as recited in claim 4 wherein the concentration of trivalent cerium ions range from 0.1 to 0.15 percent weight of glass and the concentration of trivalent thulium ions range from 0.05 to 0.75 percent weight of glass.

6. A method as recited in claim 1 wherein said oxide glass is selected from the group consisting of borax glass, calibo glass and germanate glass and said dopant ion pair is a combination of trivalent bismuth and trivalent europium.

7. A method as recited in claim 6 wherein the concentration of trivalent bismuth ions range from 0.1 to 1.0 weight percent of said glass and trivalent europium ions range from 0.2 to 4.0 weight percent of said glass.

8. A method as recited in claim 1 wherein said oxide glass is selected from a group consisting of borax glass and germanate glass and said dopant ion pair is a combination of trivalent bismuth and trivalent samarium.

9. A method as recited in claim 8 wherein the concentration of trivalent bismuth ions range from 0.1 to 1.0 weight percent of said glass and said trivalent samarium ions range from 0.2 to 0.8 weight percent of said glass.

10. A method as recited in claim 5 wherein said homogenized mixture selectively includes borate glass heated to about 1100° C for at least 15 minutes.

11. A method as recited in claim 4 wherein said phosphate glass included in said homogenized mixture is dried for 24 hours at a temperature of 100° C and said homogenized mixture including phosphate glass is heated to 1000° C for at least 15 minutes and subjected to air-oxidation until a clear glass matrix is obtained.

12. A method as recited in claim 10 wherein said borate glass matrix is subjected to air-oxidation following heating until a clear glass matrix is obtained.

13. A method as recited in claim 6 wherein said oxide glass is calibo glass and said homogenized glass matrix is heated successively to about 900° C for one hour and 1100° C for two hours.

14. A method as recited in claim 3 wherein said oxide glass is germanate glass dried at 150° C before addition to said homogenized mixture and said homogenized mixture is heated to 1250° C for three hours.

15. A method as recited in claim 4 wherein said oxide glass is calibo glass predetermined relative concentrations and said homogenized glass matrix is heated successively to about 900° C for one hour and at about 1100° C for two hours and subjected to air oxidation following heating until a clear glass matrix is obtained.

16. A method as recited in claim 3 wherein said oxide glass is germanate glass and said dopant ion pair is a combination of trivalent bismuth and trivalent europium and said homogenized glass matrix is heated to 1250° C for 3 hours.

17. A method as recited in claim 3 wherein said oxide glass is germanate glass and said dopant ion pair is a combination of trivalent bismuth and trivalent samarium and said homogenized glass matrix is heated to 1250° C for three hours.

18. A method as recited in claim 3 wherein said oxide glass is borax glass and said dopant ion pairs are selectively combinations of trivalent bismuth and trivalent europium or trivalent bismuth and trivalent samarium, said borax glass dried at 150° C before addition to said homogenized mixture and said homogenized mixture is heated to 1100° C for thirty minutes.

* * * * *